Sept. 21, 1926.
H. C. METZGER
REAMER
Filed July 22, 1925
1,600,770
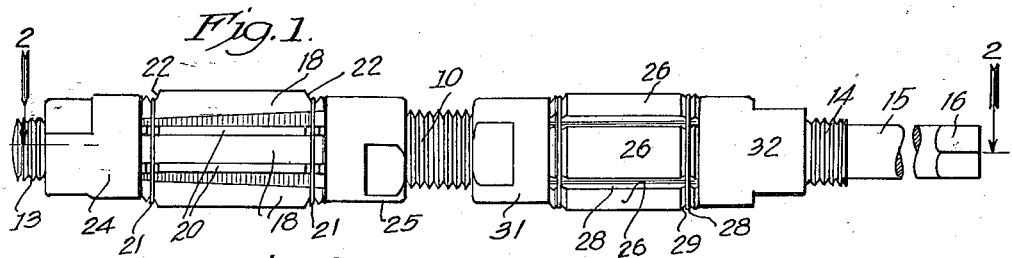
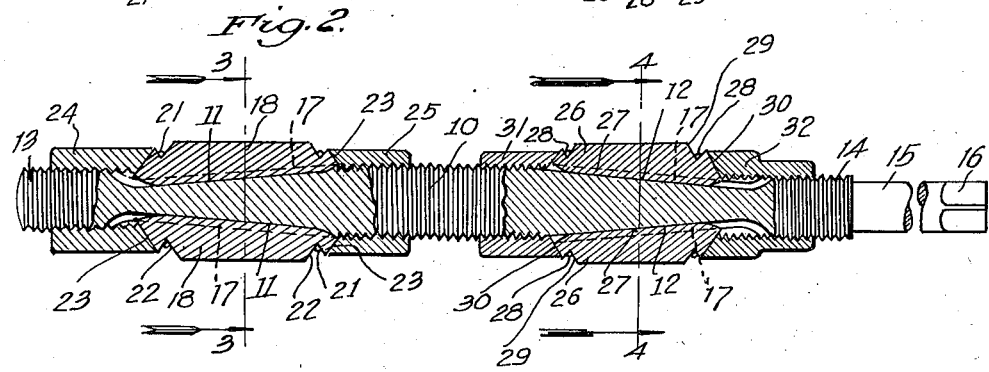
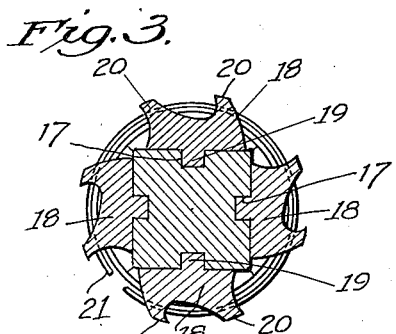 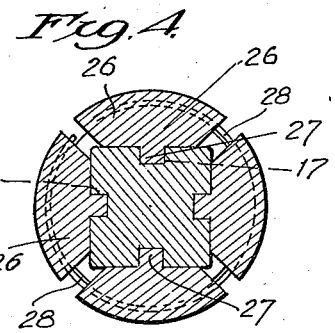
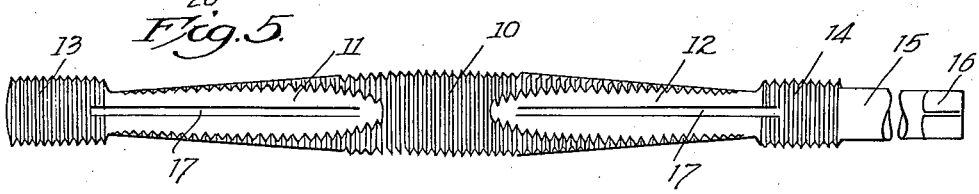
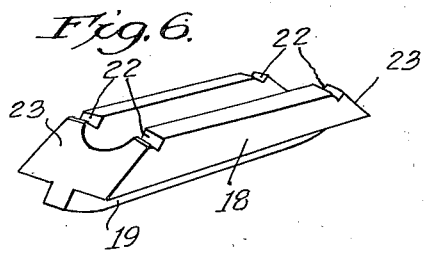
Inventor:
Harry C. Metzger,
by Hazard and Miller
Attys.

Patented Sept. 21, 1926.

1,600,770

UNITED STATES PATENT OFFICE.

HARRY C. METZGER, OF LOS ANGELES, CALIFORNIA.

REAMER.

Application filed July 22, 1925. Serial No. 45,221.

This invention relates to improvements in reamers having expansible cutters and expansible guides.

An object of the invention is to provide an improved reamer which is especially adapted to be used in reaming pistons for the reception of wrist pins, although the reamer may be readily used for other purposes as well.

Another object of the invention is to provide a reamer having an expansible cutter located adjacent one end of the reamer and an expansible guide located adjacent the other end of the reamer for a purpose hereinafter more fully described.

With the foregoing and other objects in view which will be made manifest in the following detailed description and specifically pointed out in the appended claim, reference is had to the accompanying drawings for an illustrative embodiment of the invention, wherein:

Figure 1 is a side elevation of the improved reamer,

Fig. 2 is a sectional view through the reamer and may be considered as taken upon the line 2—2 of Fig. 1, Fig. 3 is a section taken upon the line 3—3 of Fig. 2, Fig. 4 is a section taken on the line 4—4 of Fig. 2, Fig. 5 is a side elevation of the spindle or arbor of the reamer, and Fig. 6 is a perspective view of one of the cutter segments.

Referring to the accompanying drawings wherein similar reference characters designate similar parts throughout, the improved reamer consists of a threaded spindle 10, adjacent one end of which are formed a plurality of flat surfaces 11. These surfaces are inclined to the axis of the spindle 10 so as to give the appearance to the spindle of being tapered. Adjacent the other end of the spindle 10 there is arranged a plurality of flat surfaces 12 similar in form to the surfaces 11. Each end of the spindle 10 is somewhat reduced in diameter and is exteriorly threaded, as indicated at 13 and 14 respectively, and a shank 15 extends from the threaded end 14 which has a squared portion 16 facilitating the application of a wrench to the spindle, or if desired the spindle may be mounted between the jaws on a chuck. Keyways 17 are formed upon each of the surfaces 11 and 12, and slidable on the surfaces 11 are cutter segments 18. These cutter segments are provided with keys 19 upon their under sides, which slide within the keyways 17.

In the preferred form of construction each cutter segment is provided with two cutting edges 20, there being a chipthroat formed on each cutter segment between each of its cutting edges. The cutter segments 18 are mounted about the spindle 10 by means of resilient split rings 21, which may be formed of spring wire and the like and which are positioned within grooves 22 formed upon the exterior surfaces of the cutter segments adjacent each end. The end edges of the cutter segments are beveled off, as indicated at 23, and nuts 24 and 25 are threaded onto the spindle, these nuts being countersunk so as to engage upon the beveled edges 23. By screwing the nuts 24 and 25 in the same direction upon the spindle, the cutter segments 18 will be caused to move longitudinally of the spindle so that the cutter formed by the segments may be expanded or contracted depending upon the direction of movement on the spindle.

Guide segments 26 are slidable upon the surfaces 12. These guide segments have exterior cylindrical surfaces and are provided with keys 27 on their under sides, which are slidable within the keyways 17 formed on the surfaces 12. The guide segments 26 are maintained about the spindle by means of resilient split rings 28, similar to the split rings 21; these split rings being disposed within grooves 29 formed upon the exterior surfaces of the guide segments adjacent their ends. The end edges of the guide segments are beveled, as indicated at 30, so as to be engaged by the countersunk surfaces upon the nuts 31 and 32, which are threaded upon the spindle. The guide formed by the guide segments 26 can be expanded or contracted in the same way that the cutter is expanded or contracted, namely by rotating the nuts 31 and 32.

In using the improved mandrel for reaming out a piston, the cutter is adjusted to ream out the desired size of hole, and the hole on one side of the piston is then reamed. After this hole has been reamed, the spindle is extended through the piston, and the guide is adjusted so that the exterior surfaces of the guide segments 26 bear upon the interior surfaces of the hole. In such position the spindle can be rotated, and when the cutter reams out the hole on the other side of the piston, it will be caused to be formed straight and true, because of the fact that the guide is snugly fitting within the hole on the first side of the piston.

From the above it will be readily appreciated that an improved reamer is provided which consists essentially of a spindle having an expansible cutter adjacent one end and an expansible guide adjacent the other end, the cutter and guide being so constructed that they may expand or contract independently of each other.

It will be understood that various changes may be made in the detail of construction without departing from the spirit and scope of the invention as defined by the appended claim.

I claim:

A reamer comprising a threaded mandrel which is tapered towards its ends and which has a set of flat faces thereon adjacent each end, a set of cutter segments slidable upon one of the sets of faces, a set of guide segments slidable upon the other set of faces, there being a longitudinal groove formed centrally of each face and a key formed on each segment fitting within its respective groove, each segment having grooves formed thereon adjacent its ends and split rings disposed about the sets of cutter and guide segments fitting in the grooves for maintaining the segments about the mandrel, nuts threaded onto the mandrel against the ends of the guide segments for shifting the guide segments on the mandrel, and nuts threaded onto the mandrel against the opposite ends of the cutter segments for shifting the cutter segments on the mandrel.

In testimony whereof I have signed my name to this specification.

HARRY C. METZGER.